(12) United States Patent
Terao et al.

(10) Patent No.: US 7,251,330 B2
(45) Date of Patent: Jul. 31, 2007

(54) CONTENT PLAYBACK SYSTEM, CONTENT PLAYBACK METHOD, CONTENT PLAYBACK REQUESTING APPARATUS, AND TEMPORARY PLAYBACK APPARATUS

(75) Inventors: Hajimu Terao, Kanagawa (JP); Ken Kurihara, Tokyo (JP)

(73) Assignee: Sony Corporation (JP)

( * ) Notice: Subject to any disclaimer, the term of this patent is extended or adjusted under 35 U.S.C. 154(b) by 528 days.

(21) Appl. No.: 09/790,046

(22) Filed: Feb. 21, 2001

(65) Prior Publication Data
US 2001/0034714 A1    Oct. 25, 2001

(30) Foreign Application Priority Data
Feb. 23, 2000    (JP) ............................. 2000-045902

(51) Int. Cl.
*H04K 1/00*    (2006.01)
*H04L 9/00*    (2006.01)
(52) U.S. Cl. ....................... 380/255; 713/169
(58) Field of Classification Search ................ 380/201
See application file for complete search history.

(56) References Cited
U.S. PATENT DOCUMENTS 5,790,423 A * 8/1998 Lau et al. ..................... 700/94
5,896,454 A   4/1999 Cookson et al. ............... 380/5
5,926,624 A * 7/1999 Katz et al. .................. 709/217
6,574,609 B1 * 6/2003 Downs et al. ................ 705/50

FOREIGN PATENT DOCUMENTS

EP    0849734    6/1998
WO    WO9918506    4/1999

OTHER PUBLICATIONS

MP3car.com Hardware, Wayback Machine, retreived on Jun. 20, 2005, Published date Dec. 2, 1998, http://web.archive.org/web/19981202113022/www.mp3car.com/tethered.html.*
Menezes, A. J., Van Oorschot, P.C., Vanstone, S. A., Handbook of Applied Cryptography, 1997, pp. 300-308 and 440-453, CRC Press.*

* cited by examiner

*Primary Examiner*—Nasser Moazzami
*Assistant Examiner*—Brandon Hoffman
(74) *Attorney, Agent, or Firm*—Lerner, David, Littenberg, Krumholz & Mentlik, LLP

(57) ABSTRACT

A content playback system for sharing content possessed by many users who each hold a token of encrypted content, the content playback system including a playback requesting apparatus which holds a token and which requests the playback of the encrypted content, and a temporary playback apparatus for performing the playback of the encrypted content in response to a playback request of the content. The temporary playback apparatus transmits a token sending request in a form in which an identifier of the content and a digital signature are attached. The playback requesting apparatus returns the token to the temporary playback apparatus only when an authentication procedure for the digital signature is successful.

14 Claims, 8 Drawing Sheets

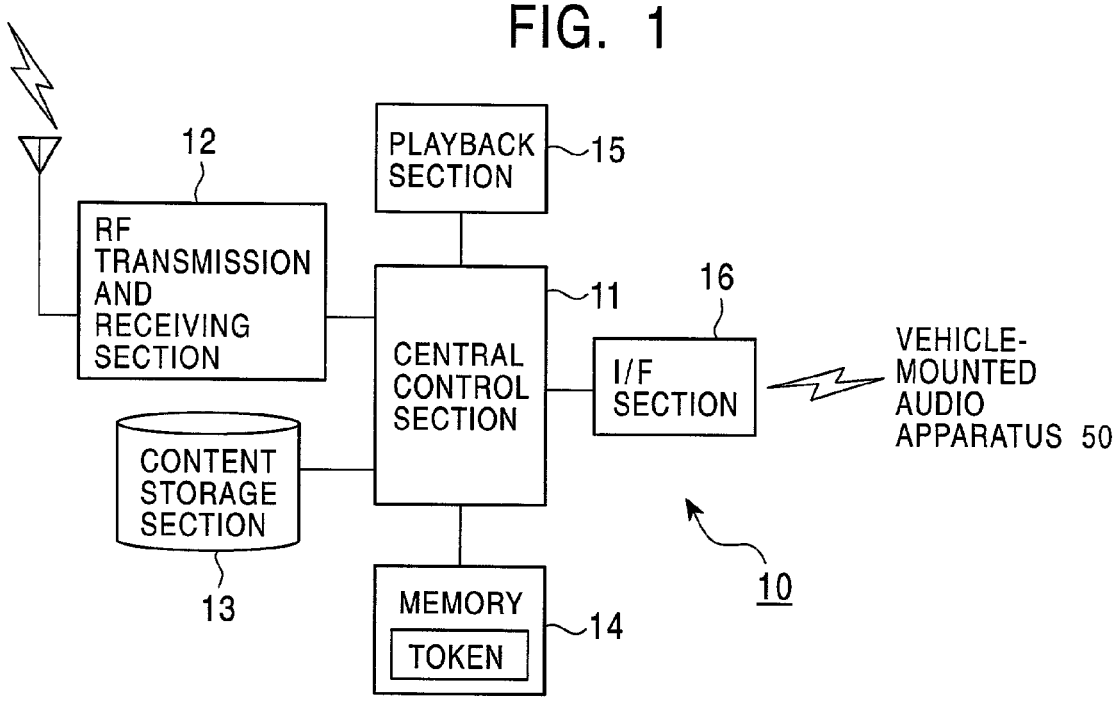
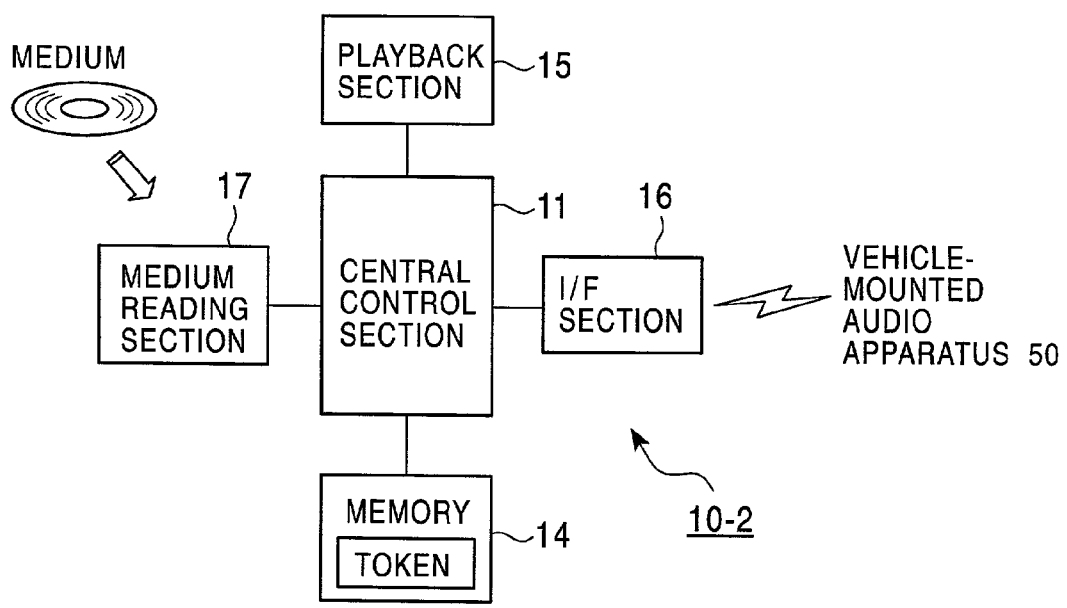

| MUSIC TITLE | ARTIST NAME | CONTENT ID |
|---|---|---|
| MUSIC TITLE | ARTIST NAME | CONTENT ID |
| MUSIC TITLE | ARTIST NAME | CONTENT ID |
| | | |
| MUSIC TITLE | ARTIST NAME | CONTENT ID |

CONTENT PLAYBACK SYSTEM, CONTENT PLAYBACK METHOD, CONTENT PLAYBACK REQUESTING APPARATUS, AND TEMPORARY PLAYBACK APPARATUS

BACKGROUND OF THE INVENTION

1. Field of the Invention

The present invention relates to a content playback technique which uses digital content and, particularly, to a content playback technique capable of securely (that is, while protecting the copyright) using content, such as music and video, having a predetermined use right, including the copyright, by a content creator.

More particularly, the present invention relates to a content playback technique for performing copyright protection by permitting use of encrypted content by using a token and, particularly, to a content playback technique capable of sharing content among plural users having a token of encrypted content.

2. Description of the Related Art

A copyright is a relative, exclusive right capable of using authored material and is contained in one of commonly called "intangible property rights". The "authored material" referred to herein is one in which thoughts or feelings are expressed in a creative manner and refers to one which belongs to the fields of the arts, sciences, fine arts, or music. A copyright is protected by, for example, copyright acts by individual countries and by international treaties such as the Berne Convention and the Universal Copyright Convention.

It is quite rare for a copyright to be used by the copyright owner himself, and it is usual for the copyright owner to obtain a fixed amount of payment for the use of the copyright by another person, and consents to the use of the copyright. For example, a record company having copyrights on music content such as musical pieces can demand copyright royalties corresponding to the number of times the content is used, with respect to a broadcasting station which uses, that is, broadcasts, music content and with respect to content distribution dealers.

In recent years, information processing and information communication technologies have made rapid progress, and internationalization has advanced remarkably in the cultural and economical fields. In such a social environment, the situation concerning copyrights is constantly changing. It is said that the history of copyright protection dates from the invention of printing technology at around the middle of the fifteenth century. At the present time, all data and content are being digitized, so that they can be handled on computer systems, and as a consequence of this, distribution of authored material and the form of sale have been transformed, and duplication of copyrighted material is becoming progressively easier. Therefore, it is considered to be necessary to assist authorized use of copyrighted material or to eliminate unauthorized use thereof from the viewpoint of information technology, and to expand the protection of copyrights.

For example, conventionally, distribution and sale of music content are performed solely by displaying physical media, such as record discs and CDs (Compact Discs), on sale in a store via physical distribution channels and the market. However, recently, distribution and sale forms are becoming popular such that music content as digital data is provided on a Web site such as on a WWW (World Wide Web) server, that is, music content is distributed in a public network environment such as the Internet. In the content distribution action of the latter case, the presence of physical media and physical distribution, and sale channels are completely omitted. That is, almost no physical limitation conditions are imposed, and each ordinary user can freely obtain content.

For example, a terminal on the street for digital content sale can be disposed in a public place such as a convenience store, so that a user can download, that is, purchase, music content at that place. Alternatively, the user himself can download music data from the user's home through a telephone line. Furthermore, as a result of the expansion of a mobile environment, it has become possible to download music content at a desired place at a desired time period by using the line of a portable telephone.

Recently, portable information apparatuses called "multi-functional portable terminals" have appeared. This type of portable apparatus has not only a portable telephone function and an Internet access function so as to download music content, but also has a music content playback function and an apparatus-to-apparatus wireless communication function for transferring data and content to another neighboring apparatus. For the apparatus-to-apparatus wireless communication function, for example, a short-distance wireless communication technique, such as "bluetooth", can be used.

In the conventional distribution and sale of music content via physical media, the purchase action of storage media is almost equivalent to the consent of use of the authored material. In contrast, when distribution and sale are performed in the form of digital content, since duplication becomes even easier, it is necessary to curb and crack down on duplication of authored material and illicit use from a technical point of view.

The copyright protection of music content is realized by using, for example, one type of license key called a "token". The protection of music content using a token is broadly realized by the procedure such as that described below:

(1) Music content is distributed in an encrypted form.
(2) A secret key for the encrypted music content is used as a token.
(3) The token is supplied to only a content playback apparatus of an authorized user through a path in which security is ensured.
(4) Inside the content playback apparatus of the authorized user, the token is stored in a circuit module having a tamper-resistant characteristic, and the token is used to decrypt the encrypted music content. It is preferable that, in addition to a token, program codes which play back content using a token be executed within a circuit module having a tamper-resistant characteristic.

As a result, decrypted use of music content is permitted by being limited to the authorized use time in the playback apparatus of the authorized user. The "tamper-resistant characteristic" means the properties of a circuit package such that the circuit package is sealed strongly, and when an attempt to disassemble the circuit package is made so as to decrypt the internal data, the circuit itself is broken, and internal access is inevitably prohibited.

In the conventional forms of music content sale, possession of content media is a proof of being an authorized user. In contrast, when distribution and sale are performed in the form of digital content, obtaining a token rather than content is a proof of being an authorized user. In the latter case, for example, if only a token is possessed in a multi-functional portable terminal, it is possible to obtain music content via a network at any time and to play it back. That is, the music content and the token can be separated from each other and be used, and physical media need not always be carried. As a natural consequence, problems specific to handling of articles, such as breakage and loss of media, can be resolved.

However, since a token is always required to play back music content, there are several problems from the viewpoint of managing tokens.

For example, in a case where it is desired to play back music content by two or more apparatuses, conventionally, it is only required to move or replace physical media among the apparatuses. However, in the case of encrypted content, a token must be moved among the apparatuses.

In a case where free duplication of a token is admitted among apparatuses, content playback is possible at both apparatuses of the duplication source and the duplication destination, and this is convenient. However, it becomes difficult to crack down on unauthorized duplication of tokens, and copyright protection for content becomes insufficient. Furthermore, when movement of a token is permitted among apparatuses in a form in which duplication is not allowed, the copyright protection is ensured, but when the apparatuses become separated, leaving behind of the token becomes a problem. In the original apparatus in which collection of the token has failed, even if the apparatus has the encrypted music content itself, the apparatus cannot play it back. Leaving behind of the token is almost equivalent to the leaving behind of the medium.

Furthermore, in a case where plural users bring tokens and authorized playback apparatuses and enjoy content playback in a state in which the tokens are concentrated in a single apparatus, when each user disperses, there is a risk in that incorrect taking of the tokens may occur. Such incorrect taking of tokens is theoretically almost equivalent to the incorrect taking of the media.

Here, a specific example is considered.

For example, in the Dec. 13, 1999 issue (n. 759) of Nikkei Electronics, pp. 139-150, a proposal is described such that "bluetooth" (described above) as a short-distance wireless data communication technique is used in a LAN (Local Area Network) inside a vehicle. In such a case, a hands-free environment can be constructed easily by integrating the portable apparatus carried by each occupant and the vehicle-mounted audio apparatus by using a wireless LAN. That is, by specifying the output target of the music content possessed by each portable apparatus to the vehicle-mounted audio apparatus, each occupant can bring music content which can usually be listened to only by one person into the vehicle and to share the playback thereof without head sets. The "portable apparatus" referred to herein may be the above-mentioned multi-functional portable terminal.

Also in such a use form, the vehicle-mounted audio apparatus which plays back music content must have a corresponding token.

For example, in all the portable apparatuses, by moving the tokens, together with the music contents, to the vehicle-mounted audio apparatus, centralized management of the music contents possessed by all the occupants can be performed at one place, which is convenient. It is possible for each occupant to receive a list of music titles collected by the vehicle-mounted audio apparatus via a wireless LAN and to freely select the musical pieces provided from another occupant. Furthermore, since the storage capacity of the vehicle-mounted audio apparatus can be made larger than that of the portable apparatus, it is convenient to store a large number of music contents in a centralized manner. In addition, it is possible for each occupant to share a variety of audio functions of the vehicle-mounted audio apparatus. In general, the vehicle-mounted audio apparatus is more expensive than the multi-functional portable terminal and can provide higher sound quality.

However, in order to ensure the copyright protection for each content, a token must be moved in a form in which unauthorized duplication, and illicit use and diversion are prohibited and, furthermore, the token must be collected again in each original portable apparatus. It is difficult to realize such token movement and collection by an intuitive operation.

Furthermore, when plural users collect tokens, there is a risk that troubles, such as leaving behind/forgetting to put back, incorrect taking, loss, etc., of tokens, may occur. Even if the "stray" token appears, in order to reserve the content use right of the original owner, it is not permitted for the vehicle-mounted audio apparatus side to delete or discard the token freely.

On the other hand, as a method of sharing music content inside the vehicle without moving the tokens, a case can be conceived in which data played back by the original portable apparatus is transmitted to the vehicle-mounted audio apparatus in real time by using a wireless LAN, and sound is output from the audio apparatus. According to this method, since the token stays in the original portable apparatus, the operations, that is, token management, can be greatly simplified.

However, since all the music contents are not centralized in the vehicle-mounted audio apparatus, the music content possessed by an occupant cannot be freely selected by another occupant. Furthermore, while content playback is being performed, since the portable apparatus is at a fully operating state, power consumption is increased (generally, the portable apparatus is battery-driven, and an increase in the power consumption is serious). Furthermore, from a theoretical point of view, since it is merely that line-out output is made from the portable apparatus and the vehicle-mounted audio apparatus is used simply as an audio amplifier, it is not possible to enjoy a variety of audio functions of the vehicle-mounted audio apparatus.

SUMMARY OF THE INVENTION

An object of the present invention is to provide a superior content playback technique capable of securely (that is, while protecting the copyright) using content, as music and video, of which a content creator has a predetermined use right, including the copyright.

Another object of the present invention is to provide a superior content playback technique capable of performing copyright protection by permitting use of encrypted content by using a token.

Yet another object of the present invention is to provide a superior content playback technique capable of sharing content possessed by each person among plural users who have a token of the encrypted content.

The present invention has been achieved in view of the above-described objects. According to a first aspect of the present invention, there is provided a content playback system for playing back encrypted content which can be decrypted by a token, the content playback system comprising: playback requesting means which holds a token and which requests playback of the encrypted content; and temporary playback means for requesting sending of a token to the playback requesting means in response to the content playback request and for performing playback of the encrypted content by using the token.

Here, the playback requesting means and the temporary playback means may be connected to each other by short-distance wireless data communication. An example of such short-distance wireless data communication is "bluetooth".

The playback requesting means may hold one or more encrypted content and a token for each encrypted content, and may transfer the held encrypted content to the temporary playback means. Furthermore, the temporary playback means may comprise means for storing the encrypted content received from one or more playback requesting means.

The temporary playback means may transmit a request for sending a token in a form in which an identifier of content for which playback has been requested and a digital signature are attached. In such a case, the playback requesting means may send back the token to the temporary playback apparatus only when an authentication procedure for the digital signature is successful. Otherwise, it is possible not to send back the token in order to prevent posing as an authorized apparatus.

The temporary playback means may have a public key and a secret key of a public key cryptosystem. Furthermore, the public key of the temporary playback means may be contained in the digital signature. In such a case, the playback requesting means may encrypt the token by the public key of the temporary playback means, making it possible to send back the token securely.

The playback requesting means and/or the temporary playback means is mounted on a circuit package having a tamper-resistant characteristic. As a result, it is possible to completely eliminate illicit actions, such as analysis, leakage, and falsification of the token and the content by an unauthorized and malicious user and to improve the security level even more.

In a use environment in which the playback requesting means and the temporary playback means can be connected to each other by short-distance wireless data communication, a plurality of the playback requesting means may be present within an area in which communication is possible by the short-distance wireless data communication. In such a case, if the temporary playback means may broadcast a token sending request, this is efficient.

According to a second aspect of the present invention, there is provided a content playback method for playing back encrypted content which can be decrypted by a token in a system comprising a playback requesting apparatus which holds a token and which requests the playback of encrypted content, and a temporary playback apparatus for performing playback of the encrypted content in response to the content playback request, the content playback method comprising: a step (a) in which the playback requesting apparatus transmits a content playback request with an attached content identifier; a step (b) in which the temporary playback apparatus transmits a token in a form in which an identifier of content for which playback has been requested and a digital signature are attached; a step (c) in which the playback requesting apparatus sends back the token to the temporary playback apparatus only when an authentication procedure for the digital signature is successful; and a step (d) in which the temporary playback apparatus plays back the content for which playback has been requested by using the received token.

Here, the playback requesting apparatus and the temporary playback apparatus may be connected to each other by short-distance wireless data communication. An example of such short-distance wireless data communication is "bluetooth".

In the content playback method, the playback requesting apparatus holds one or more encrypted content and a token for each encrypted content. The content playback method may further comprise: a step (a)' in which the playback requesting apparatus transfers the encrypted content in advance to the temporary playback apparatus; and a step (a)" in which the temporary playback apparatus stores the encrypted content.

The temporary playback apparatus may have a public key and a secret key of a public key cryptosystem. The public key of the temporary playback apparatus may be contained in the digital signature which is transmitted in the above-described step (b). In such a case, the playback requesting apparatus may encrypt the token by the public key of the temporary playback apparatus, thereby making it possible to send the token back securely in the above-described step (c).

The playback requesting apparatus and/or the temporary playback apparatus may be mounted on a circuit package having a tamper-resistant characteristic. As a result, it is possible to completely eliminate illicit actions, such as analysis, leakage, and falsification of the token and the content by an unauthorized and malicious user and to improve the security level even more.

In a use environment in which the playback requesting apparatus and the temporary playback apparatus can be connected to each other by short-distance wireless data communication, a plurality of the playback requesting apparatus may be present within an area in which communication is possible by the short-distance wireless data communication. In such a case, if the temporary playback apparatus broadcasts a token sending request in the above-described step (b), this is efficient.

According to a third aspect of the present invention, there is provided a playback requesting apparatus for requesting the playback of encrypted content which can be decrypted by a token, the playback requesting apparatus comprising: token holding means for holding a token; content storage means for storing encrypted content; interfacing means for exchanging data with an external apparatus; and control means for controlling the operation of the apparatus.

In the playback requesting apparatus in accordance with the third aspect of the present invention, the control means sends back the token only when an authentication procedure for the digital signature is successful, in response to receiving the token sending request with a digital signature via the interfacing means, thereby making it possible to appropriately eliminate posing as an authorized apparatus by an external apparatus.

In a case where a public key of the token sending requesting source is contained in the digital signature, the control means may encrypt the token by using the public key, making it possible to securely send back the token to the requesting source.

According to a fourth aspect of the present invention, there is provided a temporary playback apparatus for temporarily playing back encrypted content which can be decrypted by a token, the temporary playback apparatus comprising: signature holding means for holding a digital signature; secret key holding means for holding the secret key of the apparatus itself; content storage means for storing encrypted content; interfacing means for exchanging data with an external apparatus; content playback means for playing back content which is converted to plain text; and control means for controlling the operation of the apparatus.

In the temporary playback apparatus in accordance with the fourth aspect of the present invention, the control means can transmit a token sending request with a digital signature in order to request the sending of a token corresponding to the requested content, in response to receiving a content playback request via the interfacing means. In the token sending request source, it is possible to authenticate the temporary playback apparatus by using this digital signature, making it possible to appropriately eliminate posing as an authorized apparatus.

The control means can cause the playback of the content to be performed by using the token in response to receiving the sending back of the token for the token sending request.

The temporary playback apparatus may further comprise token holding means for holding the token only temporarily.

The "temporary token holding" referred to herein includes one in which the token is not stored for a long period of time, the token is discarded at the time when the playback requesting apparatus is taken out of a range in which short-distance wireless data communication is possible, furthermore the token is not duplicated and is not transferred to an external apparatus without permission. In other words, the "temporary token holding" means that the token, which is a proof of an authorized user, is stored in a range of the consent of use of the copyright (or a range which can be permitted in a commonly accepted idea of transactions).

The content playback system according to the present invention comprises the playback requesting apparatus and the temporary playback. For example, the playback requesting means is installed as a portable apparatus carried by each user, and the temporary playback means is installed as an audio apparatus capable of sharing a playback function among the users. Therefore, a one-to-one, multiple-to-one, or multiple-to-multiple relationship is formed between the playback requesting means and the temporary playback means. More preferably, the temporary playback means has a content playback function which is more advanced than that of the playback requesting means.

Interconnection is realized between the playback requesting means and the temporary playback means by using short-distance wireless data communication, such as, for example, "bluetooth", and packets can be exchanged.

Each playback requesting means usually holds encrypted content and a token corresponding thereto, and transfers only the encrypted content to the temporary playback means in advance.

When the playback requesting means issues a content playback request to the temporary playback means, the temporary playback means requests the playback requesting means to send a token required to decrypt the content. The token request preferably contains the identifier of the token for which playback has been requested and the digital signature of the temporary playback means. Furthermore, when a plurality of playback requesting means is present, the temporary playback means may broadcast the token sending request.

When the playback requesting means receives the token sending request, the playback requesting means authenticates the temporary playback means on the basis of the digital signature. Then, only when the authentication succeeds, the token is sent back, and when the authentication fails, the token is not sent back to prevent unauthorized use of the token. Furthermore, since the token is information having high secrecy, it is preferable that the token be encrypted using a public key of the temporary playback means and be sent.

The temporary playback means which has received the token can decrypt the encrypted content and play it back. That is, basically, the playback requesting means which holds the encrypted content can cause the temporary playback means having advanced playback performance to perform content playback securely instead of performing content playback by the playback requesting means itself.

The above and further objects, aspects and novel features of the invention will become more fully apparent from the following detailed description when read in conjunction with the accompanying drawings.

BRIEF DESCRIPTION OF THE DRAWINGS

FIG. 1 is a functional block diagram schematically showing the hardware configuration of a portable apparatus 10 according to an embodiment of the present invention;

FIG. 2 is a functional block diagram schematically showing the hardware configuration of another arrangement 10-2 of the portable apparatus according to the embodiment of the present invention;

DESCRIPTION OF THE PREFERRED EMBODIMENTS

Figure 3:
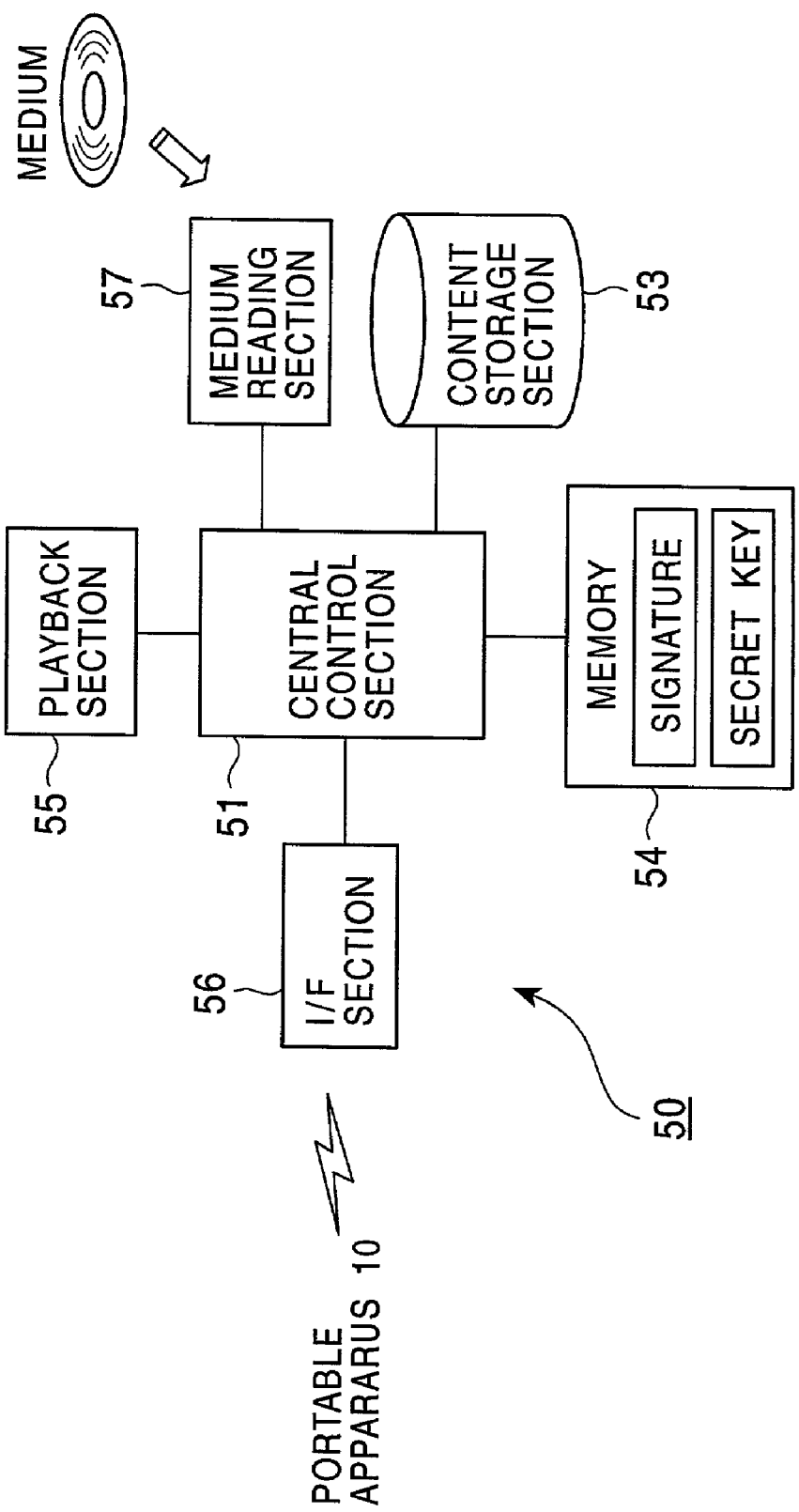
FIG. 3 is a functional block diagram schematically showing the hardware configuration of a vehicle-mounted audio apparatus 50 according to the embodiment of the present invention.

In this specification, as a specific embodiment of the present invention, a local apparatus-to-apparatus environment is taken as a specific example in which a plurality of users holding encrypted content and a token thereof with authorization bring his or her own portable apparatus into a vehicle in which a vehicle-mounted audio apparatus is installed and the respective apparatuses are interconnected by a transmission line such as a wireless LAN. The embodiments of the present invention will be described below with reference to the drawings.

FIG. 1 schematically shows the hardware configuration of a portable apparatus 10 according to an embodiment of the present invention. An example of the portable apparatus is a product of what is commonly called a "multi-functional portable terminal". It has a portable telephone function and an Internet access function so as to download music content, and further has a music content playback function, an apparatus-to-apparatus wireless communication function for transferring data and content to another neighboring apparatus.

As shown in FIG. 1, the portable apparatus 10 comprises a central control section 11 for centrally controlling the operation of the interior of the apparatus, an RF transmission and receiving section 12 for transmitting and receiving radio waves, a content storage section 13 for storing music content, a local memory 14 for the central control section 11, a playback section 15 for playing back the music content so as to output it to the outside as audio data, and an interface section 16 for interconnection with a vehicle-mounted audio apparatus 50 (to be described later) by means such as short-distance wireless data communication.

In order for this portable apparatus 10 to obtain encrypted music content and a token as an authorized use consent thereof, for example, connection is made to an access point of a predetermined content provider by a portable telephone line, etc., and the encrypted music content and the token are received. The encrypted music content is stored in the content storage section 13, and the token is stored in the local memory 14.

The local memory 14 is composed of a functional part for storing, in a nonvolatile manner, program codes for controlling the operation of the apparatus 10, and a functional part for, temporarily or in volatile manner, writing the token and work data of the central control section 11. Since program codes and part of the work data, which are used in this embodiment, have high secrecy, it is preferable that the central control section 11 and the local memory 14 be formed of LSI (Large-Scale Integration) chips having a tamper-resistant characteristic.

In order to play back music content in this portable apparatus 10, the central control section 11 reads desired encrypted music content from the content storage section 13, takes out the corresponding token from the local memory 14, decrypts the music content by using the token, and thereby sound output is made in the playback section 15. For the content playback, a playback operation may be performed in real time with the reception of the content without storing the content in the content storage section 13.

In a case where music content is to be played back in a stand-alone state, the portable apparatus 10 requires the playback section 15 formed of an audio amplifier, a speaker, etc. However, in a case where only the content playback function of the vehicle-mounted audio apparatus 50 is used, the playback section 15 is unnecessary.

The music content which is temporarily stored in the portable apparatus 10 can also be transferred to an external apparatus, such as the vehicle-mounted audio apparatus 50, via the interface section 16, so that the music content can be played back to the outside. The details of the procedure thereof will be described later.

FIG. 2 schematically shows the hardware configuration of another arrangement 10-2 of the portable apparatus according to the embodiment of the present invention.

As shown in FIG. 2, the portable apparatus 10-2 comprises a central control section 11 for centrally controlling the operation of the interior of the apparatus, a medium reading section 17 for reading data from a medium in which music content is stored, a local memory 14 for the central control section 11, a playback section 15 for playing back the music content so as to output the music content to the outside as audio data, and an interface section 16 for interconnection with a vehicle-mounted audio apparatus 50 (to be described later) by means such as short-distance wireless data communication.

In order for this portable apparatus 10-2 to obtain encrypted music content, a desired medium may be loaded into the medium reading section 17. The token as an authorized use consent for the content can be obtained through the same or different distribution channel as that of the medium, and the token can be input to the apparatus 10-2 via a console (not shown in FIG. 2). The token is stored in the local memory 14.

The local memory 14 is composed of a functional part for storing, in a nonvolatile manner, program codes for controlling the operation of the apparatus 10-2, and a functional part for, temporarily or in volatile manner, writing the token and work data of the central control section 11. Since program codes and part of the work data, which are used in this embodiment, have high secrecy, it is preferable that the central control section 11 and the local memory 14 be formed of LSI chips having a tamper-resistant characteristic.

In order to play back music content in this portable apparatus 10, the central control section 11 causes the medium reading section 17 to read desired encrypted music content from a loaded medium, to take out the corresponding token from the local memory 14, and to decrypt the music content by using the token, so that sound output is made in the playback section 15.

In a case where music content is to be played back in a stand-alone state, the portable apparatus 10-2 requires the playback section 15 formed of an audio amplifier, a speaker, etc. However, in a case where only the content playback function of the vehicle-mounted audio apparatus 50 is used, the playback section 15 is unnecessary.

The music content which is temporarily stored in the portable apparatus 10-2 can also be transferred to an external apparatus, such as the vehicle-mounted audio apparatus 50, via the interface section 16, so that the music content can be played back to the outside. The details of the procedure thereof will be described later.

FIG. 3 schematically shows the hardware configuration of a vehicle-mounted audio apparatus 50 according to the embodiment of the present invention. This vehicle-mounted audio apparatus 50 can be connected to the portable apparatus 10 described with reference to FIGS. 1 and 2 by using, for example, a short-distance wireless data communication technique. That is, each occupant brings a portable apparatus 10 into the vehicle, so that the vehicle-mounted audio apparatus 50 can communicate with a plurality of portable apparatuses 10 and advanced music content playback services can be realized by joint operations with these apparatuses (to be described later).

As shown in FIG. 3, the vehicle-mounted audio apparatus 50 comprises a central control section 51 for centrally controlling the operation of the interior of the apparatus, a local memory 54 for the central control section 51, a playback section 55, which is formed of an audio amplifier and a speaker, for playing back music content so as to output it to the outside as audio data, an interface section 56 for interconnection with the portable apparatus 10 (described above) by means such as short-distance wireless data communication, and a content storage section 53 for storing encrypted music content sent from the portable apparatus 10 of each occupant.

Furthermore, even in a state in which the portable apparatus 10 is not installed inside the vehicle, in order to enjoy the playback of music content, the vehicle-mounted audio apparatus 50 may comprise a medium reading section 57 for reading data from a medium in which music content is stored.

When each occupant brings the portable apparatus 10 into the vehicle, each apparatus 10 is dynamically installed into an execution environment provided by the vehicle-mounted audio apparatus 50 by using, for example, a short-distance wireless data communication function. Then, each portable apparatus 10 transfers the encrypted music content into the vehicle-mounted audio apparatus 50, thereby making it possible to control the playback operation of all the music contents in a centralized manner in the vehicle-mounted audio apparatus 50.

In order to play back the encrypted music content in the vehicle-mounted audio apparatus 50, it is necessary to obtain by transfer a corresponding token from the original content owner, that is, the portable apparatus 10. However, if the portable apparatus 10 transfers the token limitlessly, the copyright protection for the music content is jeopardized. Accordingly, in this embodiment, each portable apparatus 10 is adapted to permit the transfer of the token to only the vehicle-mounted audio apparatus 50 which has succeeded in a predetermined authentication procedure (to be described later).

The conditions which are indispensable for the vehicle-mounted audio apparatus 50 to succeed in a predetermined authentication procedure are such that the token use limitation is obeyed, for example, the received token is temporarily held and the token is automatically discarded when a necessary time, such as playback of the music content, elapses, and the token is not diverted or is not transferred to another apparatus freely (that is, is an apparatus which ensures the copyright protection for the content).

The digital signature and the secret key necessary for the authentication procedure are stored in the local memory 54. The local memory 54 is composed of a functional part for storing, in a nonvolatile manner, program codes for controlling the operation of the apparatus 50, and a functional part for, temporarily or in volatile manner, writing the token and work data of the central control section 51. Since program codes and part of the work data, which are used in this embodiment, have high secrecy, it is preferable that the central control section 51 and the local memory 54 be formed of LSI chips having a tamper-resistant characteristic.

The "secret key" referred to herein is a secret key of a public key cryptosystem. The public key cryptosystem is a cryptosystem using two types of keys (asymmetrical keys), such that when one of the keys is used for encryption, decryption can be performed only by the other key. One of the keys is used as a secret key which is known to only the user and the other key is used as a public key which is made public to a third party, thereby making it possible to utilize a secret document encrypted using a public key and a digital signature encrypted using a secret key (well known).

Next, a description is given of a processing procedure of a playback service, which is realized by a joint operation of the portable apparatus 10 and the vehicle-mounted audio apparatus 50. The "playback of music content" referred to herein should be construed as meaning temporary or only one-time content playback by the vehicle-mounted audio apparatus 50.

Figure 4:
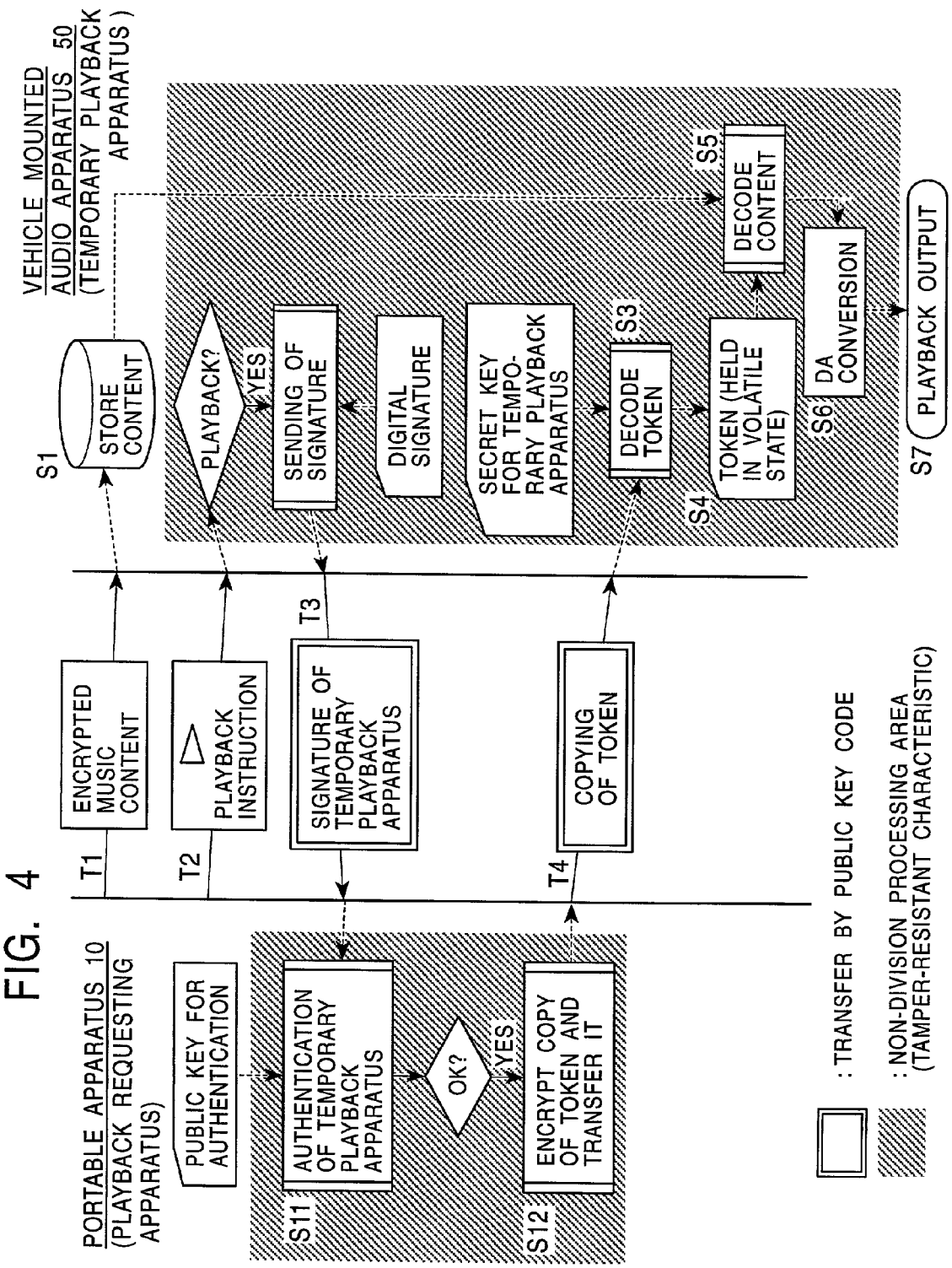
FIG. 4 is a flowchart showing the processing procedure of a music content playback service which is realized between the portable apparatus 10 and the vehicle-mounted audio apparatus 50 (the portable apparatus 10 and the vehicle-mounted audio apparatus 50 are set in a one-to-one relationship)

FIG. 4 shows in diagrammatic form the processing procedure of a music content playback service which is realized between the portable apparatus 10 and the vehicle-mounted audio apparatus 50. In the example shown in FIG. 4, for simplicity of description, the portable apparatus 10 and the vehicle-mounted audio apparatus 50 are in a one-to-one relationship. Furthermore, in the example shown in FIG. 4, it is assumed that the portable apparatus 10 functions as a "playback requesting apparatus" which requests the playback of music content, and that the vehicle-mounted audio apparatus 50 functions as a "temporary playback apparatus" which temporarily performs content playback in response to the request.

The portable apparatus 10 is brought into the vehicle in which the vehicle-mounted audio apparatus 50 according to this embodiment is mounted, thereby the portable apparatus 10 is connected to the vehicle-mounted audio apparatus 50 by short-distance wireless data communication. An example of such short-distance wireless data communication is "bluetooth".

Before a playback request is issued, the portable apparatus 10 transfers encrypted music content stored therein to the temporary playback apparatus 50 in advance (T1).

Figure 5:
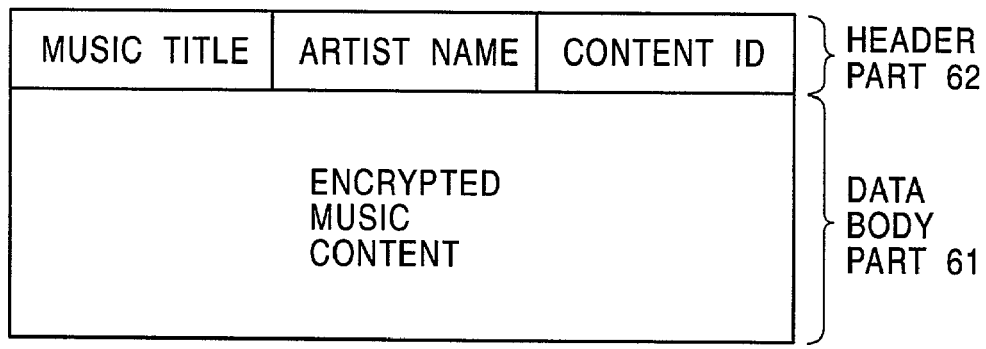
FIG. 5 is a diagram showing an example of the data structure of an encrypted music content sending packet.

FIG. 5 shows an example of the data structure of encrypted music content. As shown in FIG. 5, the encrypted music content is composed of a data body part 61 and a header part 62. The data body is a field for storing music content, in which the music content is written in an encrypted state. In the other header part 62, control information, such as a music title, an artist name, and content ID (for example, ISRC (International Standard Recording Code)), is contained. In order that the control information such as the music title can be used before the authentication procedure of the temporary playback apparatus 50, it is preferable that the header part 62 be in a plain text state which is not encrypted.

In the temporary playback apparatus 50, when such encrypted music content is received, this is stored as it is in the content storage section 53 (S1).

Next, in the playback requesting apparatus 10, a playback request is issued to the temporary playback apparatus 50 through a console (not shown) provided in the portable apparatus 10 (T2).

Figure 6:
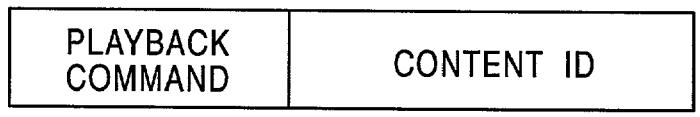
FIG. 6 is a diagram showing an example of the data structure of a playback instruction packet.

This playback request is transmitted as a "playback instruction packet" which instructs the playback of a specific music piece by short-distance wireless data communication. FIG. 6 shows an example of the data structure of the playback instruction packet. As shown in FIG. 6, the playback instruction packet contains a playback command and a content ID corresponding to a music title and can specify the playback of a specific music piece.

In order to play back the encrypted music content, a corresponding token is required. Accordingly, in the temporary playback apparatus 50, when it is determined that the packet received from the playback requesting apparatus 10 is a playback instruction packet, a token request packet containing the digital signature of the apparatus is created (S2), and the request packet is transmitted to the playback requesting apparatus 10 by using short-distance wireless data communication (T3).

Figure 7:
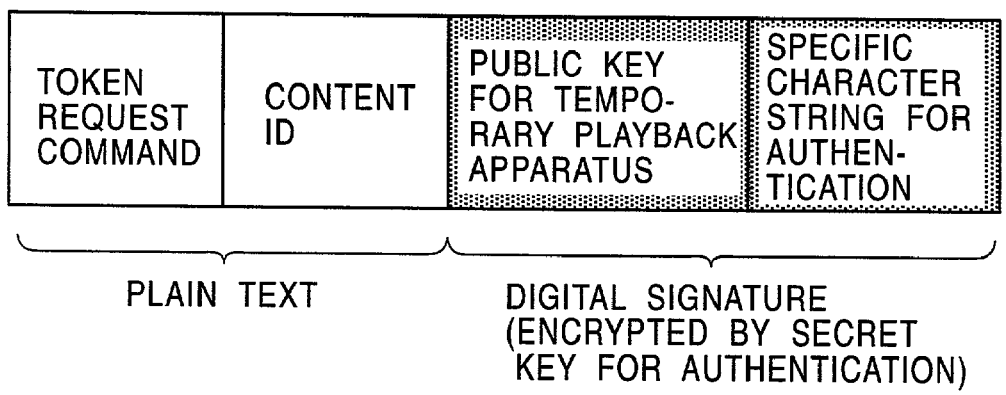
FIG. 7 is a diagram showing an example of the data structure of a token request packet.

FIG. 7 shows an example of the data structure of a token request packet. As shown in FIG. 7, the token request packet is composed of a token request command, a content ID corresponding to a music title, and a digital signature. Furthermore, the digital signature is composed of a public key of the temporary playback apparatus 50, and a specific character string used for an authentication process.

The token request command and the content ID are in the form of plain text. In contrast, since the digital signature is composed of secret data which is encrypted by a secret key for authentication, it is possible to prevent posing by an unauthorized user. Furthermore, it is preferable that the digital signature be written into a circuit chip having a tamper-resistant characteristic in advance during the manufacturing of the temporary playback apparatus, that is, the vehicle-mounted audio apparatus 50.

The secret key and the public key for authentication are managed by, for example, a manufacturer, etc., of the portable apparatus 10 and/or the vehicle-mounted audio apparatus 50. Of these, the public key for authentication can be widely used by an ordinary third party, including the portable apparatus 10. In realizing the present invention suitably, it is a precondition that the manufacturer and the product thereof assure the copyright protection of content.

In the playback requesting apparatus 10, when this token request packet is received, the digital signature is extracted from the packet, and the authentication of the temporary playback apparatus 50 is performed (S11). This authentication procedure, more specifically, is performed in such a way that the digital signature is decrypted by the public key for authentication (described above) and it is determined whether or not the specific character string for authentication could be reconstructed in a meaningful form.

When the authentication procedure is terminated successfully, the playback requesting apparatus 10 takes out the token corresponding to the content ID contained in the token request packet, and encrypts the copy thereof by the public key of the temporary playback apparatus 50, which was reconstructed from the digital signature (S12). Then, the copy of this encrypted token is sent back to the temporary playback apparatus 50 by using short-distance wireless data communication (T4).

In the temporary playback apparatus 50 which received the copy of the token, it is decrypted using the secret key thereof, and the token is taken out (S3). Then, the token is held in a volatile state (S4).

The "volatile state" referred to herein includes one in which the token is not stored for a long period of time, the token is discarded at the time when the portable apparatus 10 is taken out of the vehicle, and furthermore, the token is not duplicated and is not transferred to an external apparatus without permission. In other words, the "temporary token holding" means that the token, which is a proof of an authorized user, is stored in a range of the consent of use of the copyright (or a range which can be permitted in a commonly accepted idea of transactions).

The temporary playback apparatus 50 takes out the music content for which playback has been requested from the content storage section 53, and decrypts this content by using the obtained token (S5). Then, DA (Digital-to-Analog) conversion is performed thereon to reconstruct the music content into audio data (S6), and the music content is output to the outside by a playback section 55 formed of an audio amplifier, a speaker, etc. (S7).

In each of the playback requesting apparatus 10 and the temporary playback apparatus 50, for the diagonally shaded areas, a secure process in which risks, such as intrusion from the outside, decryption, leakage, falsification, etc., are eliminated, must be performed. Therefore, it is more preferable that program codes corresponding to these diagonally shaded areas be formed as a non-division process and be implemented on a circuit device having a tamper-resistant characteristic.

Figure 8:
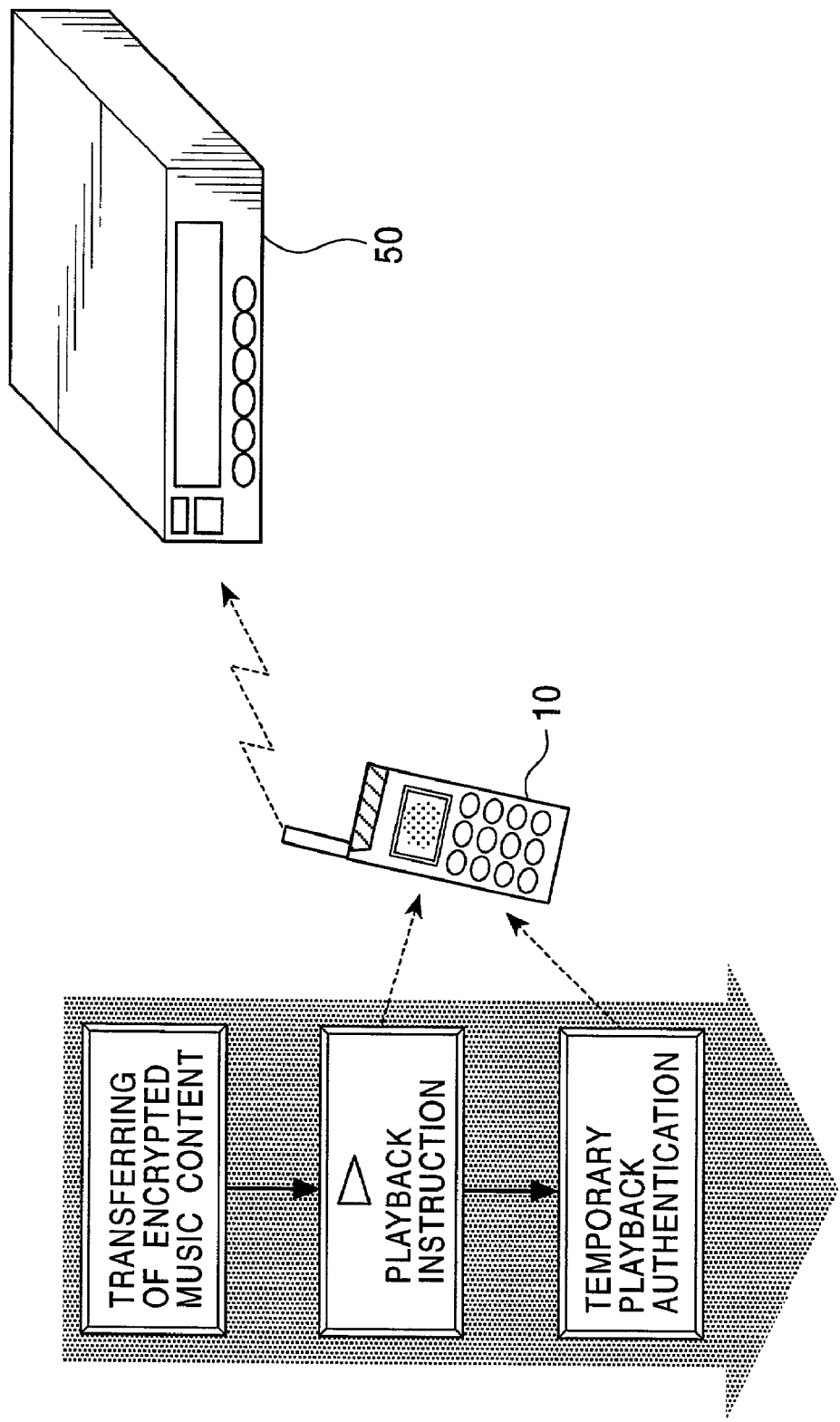
FIG. 8 is a diagram depicting an operation procedure using the portable apparatus 10 inside a vehicle.

The foregoing description was limited to a case in which the portable apparatus 10 and the vehicle-mounted audio apparatus 50 are in a one-to-one relationship, for example, in a specific vehicle. In such a case, as shown in FIG. 8, it is possible for the user to perform transfer of music content, playback instruction, and temporary playback authentication via the console screen of the portable apparatus 10.

Figure 9:
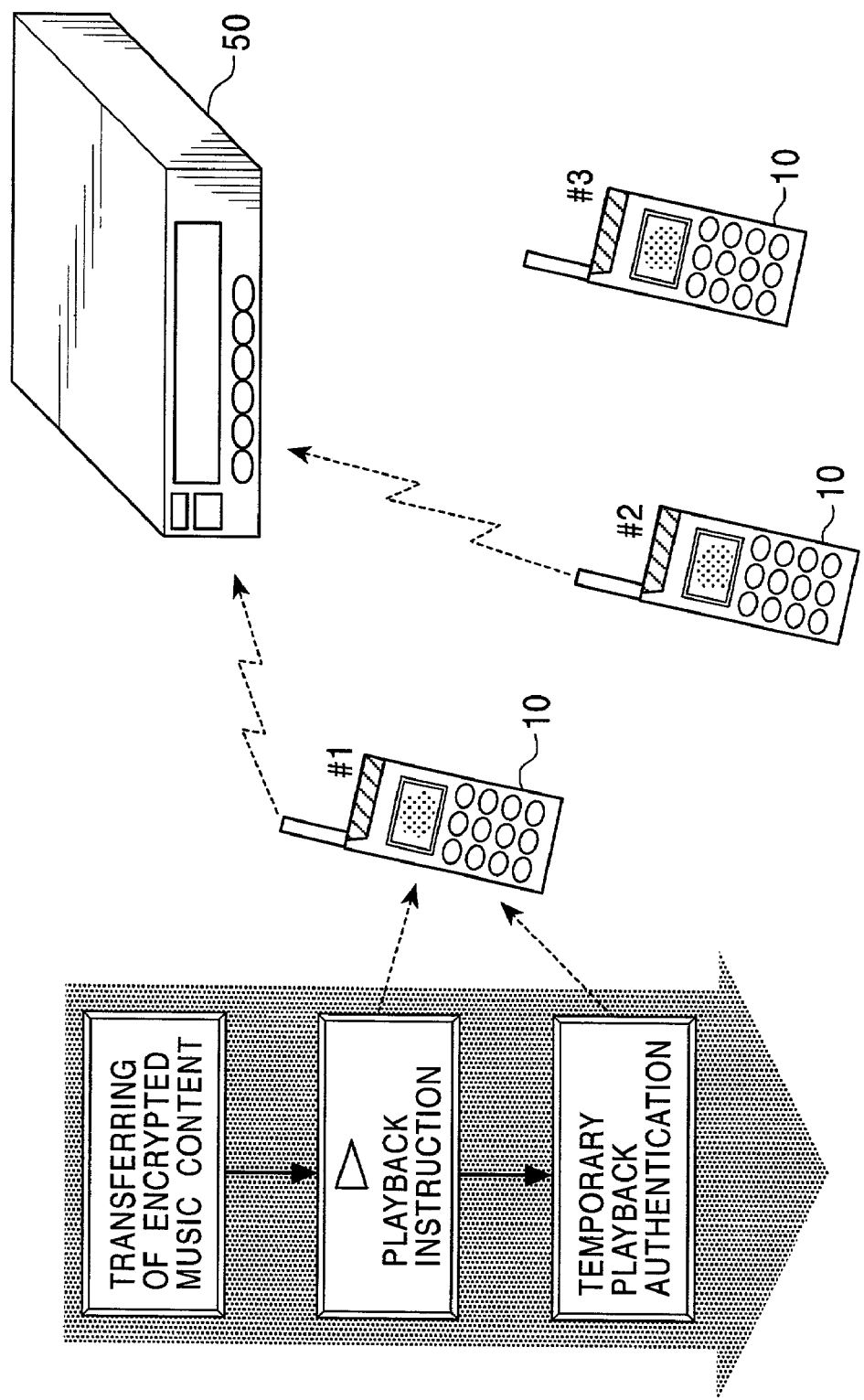
FIG. 9 is a diagram depicting an operation procedure using the portable apparatus 10 inside a vehicle.

However, often, as a result of several persons riding in a single vehicle, a plurality of portable apparatuses 10 coexist, and one vehicle-mounted audio apparatus 50 is shared. In such a case, the portable apparatus 10 and the vehicle-mounted audio apparatus 50 form a multiple-to-one relationship rather than a one-to-one relationship. As shown in FIG. 9, one vehicle-mounted audio apparatus 50 obtains music content from a plurality of portable apparatuses 10, and handles playback requests from the plurality of portable apparatuses 10.

Figure 10:
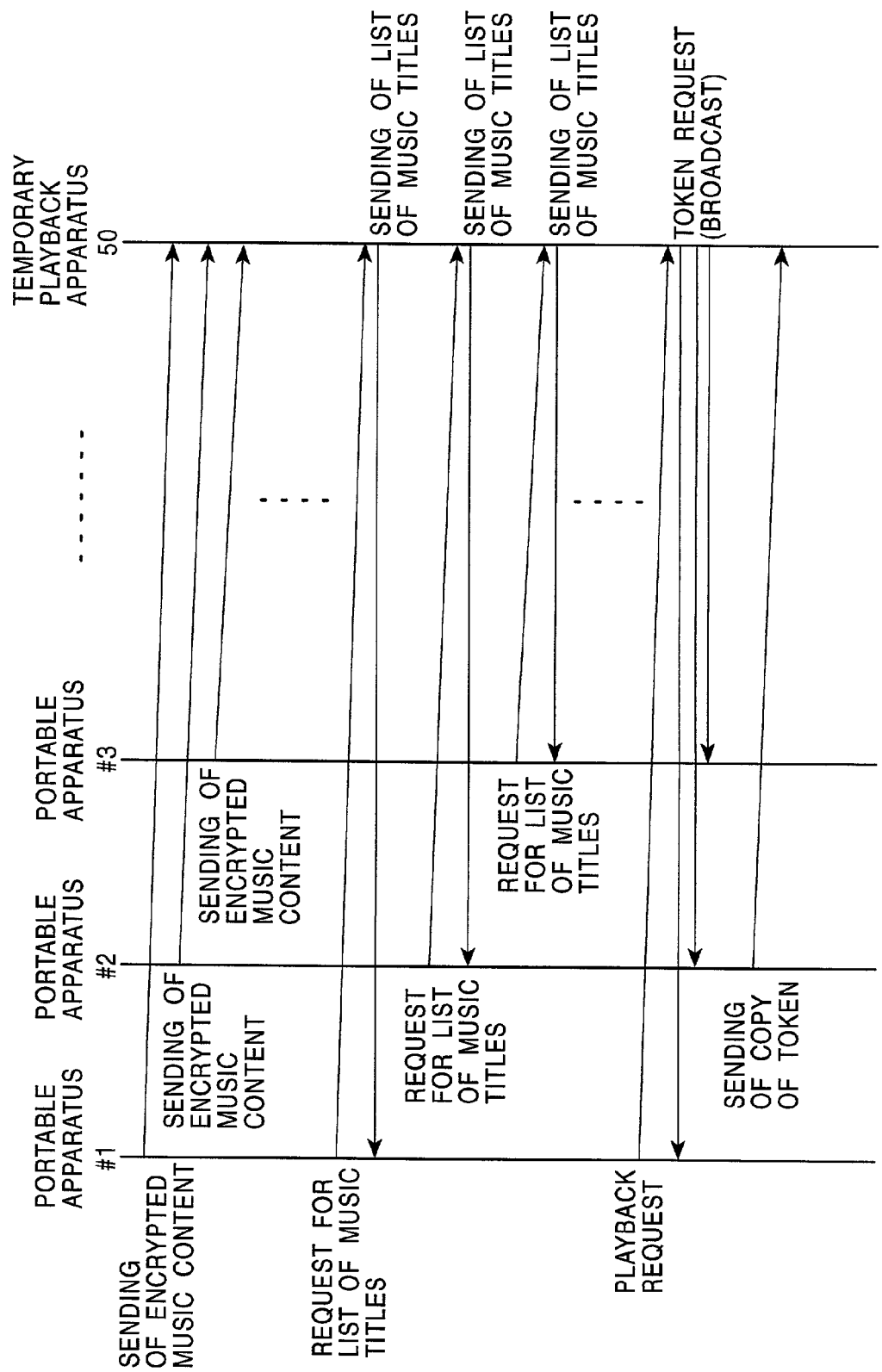
FIG. 10 is a flowchart showing the operation procedure of each apparatus in a case where the portable apparatus 10 and the vehicle-mounted audio apparatus 50 form a one-to-one relationship.

The present invention suitably operates in a manner similar to that described above even when the portable apparatus 10 and the vehicle-mounted audio apparatus 50 form a multiple-to-one relationship. This will be described below in detail with reference to the flowchart shown in FIG. 10. It is assumed that, as a general rule, transactions among the apparatuses, shown in FIG. 10, are performed by using short-distance wireless data communication.

Initially, when each occupant brings his or her portable apparatus #1, #2, #3 . . . into the vehicle, use of short-distance wireless data communication causes connection with the vehicle-mounted audio apparatus, that is, the temporary playback apparatus 50, to be established.

In such a state, each of the portable apparatuses #1, #2, #3 . . . transfers the encrypted content stored in each of them in sequence to the temporary playback apparatus 50.

The encrypted music content is composed of a data body 61 formed of encrypted content, and a header part 62 which is in plain text, as described with reference to FIG. 5. Therefore, in the temporary playback apparatus 50, it is possible to create a list of music titles about the collected music contents before an authentication procedure for each music content and sending of the token are performed (to be described later).

Each of the portable apparatuses #1, #2, #3 . . . in the vehicle can make a request for the list of music titles to the temporary playback apparatus 50. In response to this request, the temporary playback apparatus 50 sends back the list of music titles in the form of packets.

Figures 11, 12:
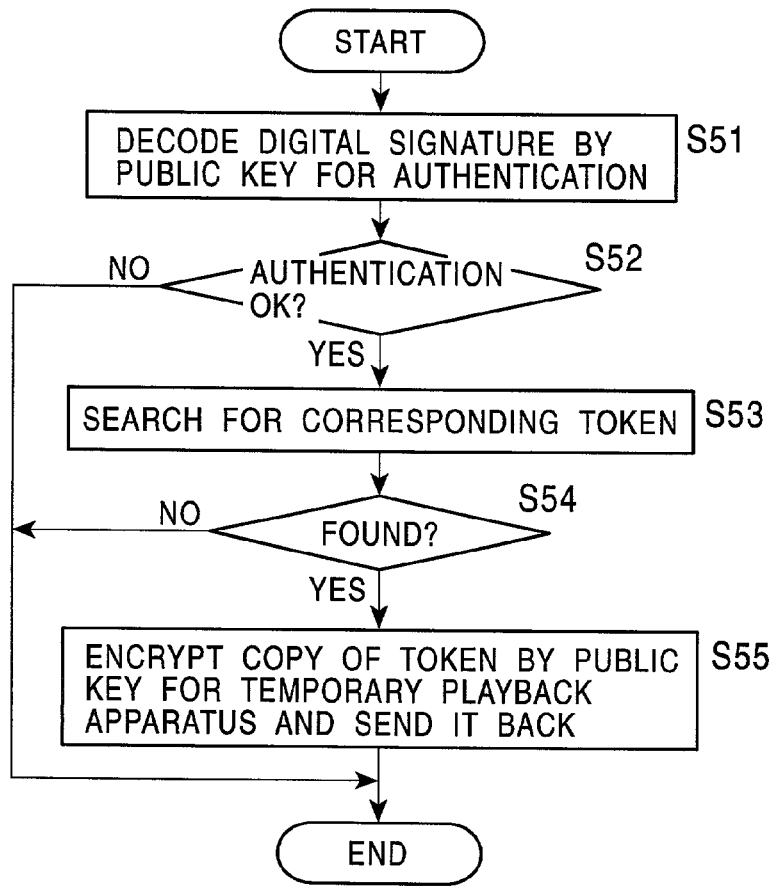
FIG. 11 is a diagram showing an example of the data structure of a music-title-list sending packet.
FIG. 12 is a flowchart showing the processing procedure performed by the portable apparatus 10 when a token request packet is received.

FIG. 11 shows an example of the data structure of a music-title-list sending packet. As shown in FIG. 11, the list of music titles may be such that the extracted header part of each music content is concatenated in accordance with a predetermined format.

In each of the portable apparatuses #1, #2, #3 . . . receiving the music-title-list sending packet, it is possible to display, on a console panel, a list of music titles for which a playback service is provided by the temporary playback apparatus 50. Furthermore, it is possible for the user of each portable apparatus to select a desired musical piece on the console panel. As a result of the selection of the musical piece, the portable apparatus issues a playback request to the temporary playback apparatus 50. This playback request, as shown in FIG. 6, is sent in the form of a playback instruction packet in which a content ID corresponding to the selected musical piece is attached.

On the other hand, in the temporary playback apparatus 50, in order to play back the encrypted music content, a corresponding token is necessary. Therefore, the temporary playback apparatus 50 creates a token request packet containing the digital signature of the apparatus and broadcasts it to the portable apparatuses #1, #2, #3 . . .

The data structure of the token request packet is as has already been described with reference to FIG. 7. That is, the token request packet is composed of a token request command, a content ID corresponding to a music title, and a digital signature. The digital signature is composed of the public key of the temporary playback apparatus 50 and a specific character string used for an authentication process. The token request command and the content ID are in the form of plain text. In contrast, since the digital signature is encrypted by a secret key for authentication, it is possible to prevent posing by an unauthorized user.

FIG. 12 shows, in the form of a flowchart, the processing procedure performed by each of the portable apparatuses #1, #2, #3 . . . when a token request packet is received. A description is given below in accordance with this flowchart.

Initially, the portable apparatus 10 extracts a digital signature from the token request packet, decrypts this signature by a public key for authentication (described above) (step S51), and performs an authentication operation (step S52). In the authentication operation, it is determined whether or not a specific character string for authentication could be reconstructed in a meaningful form from the digital signature.

When the authentication is unsuccessful, since there is a possibility that the temporary playback apparatus 50 which requested the token is an impersonation, that is, an unauthorized playback apparatus, the token sending process is not performed, and the whole of this processing routine is cancelled.

When, on the other hand, the authentication is terminated successfully, the portable apparatus 10 checks whether or not the apparatus holds the token corresponding to the content ID specified in the token request packet (in other words, whether or not the apparatus is an authorized user of the content) (step S53).

When the corresponding token could not be found, since the apparatus itself is not an authorized user of the content, the token sending process is not performed, and the whole of this processing routine is cancelled.

When, on the other hand, the corresponding token could be found, a copy of the token is encrypted by the public key of the temporary playback apparatus 50, which is contained in the digital signature, and is sent back to the temporary playback apparatus 50 (step S55).

In the temporary playback apparatus 50, when the copy of the token is received, it is possible to obtain the token by decrypting the copy by its own secret key. As a result, it is possible to play back the music content for which playback has been requested.

In the short-distance wireless data communication such as "bluetooth", the range in which wireless data reaches is almost equivalent to a range in which audio of car stereo, etc., reaches. Therefore, in a case where the vehicle-mounted audio apparatus 50 can recognize the presence of the portable apparatus 10 holding the token by short-distance wireless data communication, the owner of the token listens to the music content. Therefore, even if content playback is performed by a playback apparatus other than the original portable apparatus, it is considered that there is no problem from the viewpoint of copyright protection. Furthermore, in such circumstances, even if a playback request is issued from another portable apparatus which is not the owner of the token, it is understood that, similarly, there is no problem from the viewpoint of understanding the right.

According to the music content playback method according to this embodiment, since the token or a copy thereof is automatically transferred securely to the temporary playback apparatus which received a playback instruction, it is possible to omit the labor of moving the token between the portable apparatus 10 and the vehicle-mounted audio apparatus 50.

Even when the user of the portable apparatus sequentially switches the playback apparatuses for which playback is requested, since each temporary playback apparatus is ensured that the token is held only in a volatile manner and is not diverted to other uses without permission, management of the token can be simplified.

In addition, the present invention can also be applied to a case in which the playback requesting apparatus and the temporary playback apparatus form a multiple-to-multiple relationship. In this case, a case is also supposed in which the same music content is in a plurality of temporary playback apparatuses. In such a case, to which playback apparatus the token should be sent is a matter which should be determined by the user, that is, an authorized owner of the token, and a procedure of the token transfer in addition to the music content transfer becomes necessary.

That is to say, according to the present invention, it is possible to omit the labor of sequentially repeating necessary steps each time the playback apparatus is changed.

It has already been described that, in a manner similar to media, also in the case of tokens, problems, such as leaving behind, loss, incorrect taking, etc., may occur. For example, in a case where occupants go on for a drive while riding in multiple automobiles and change the automobiles on the way, the occupants may be at a loss, such as, to which automobile the music content has been transferred or in which automobile the token has been left behind.

In contrast, according to the present invention, since a copy of the token is sent to the trustworthy temporary playback apparatus which obtained the authentication, it is not necessary for the original playback requesting apparatus to collect the token, and there is completely no anxiety that the token may be left behind.

As has thus been described in detail, according to the present invention, it is possible to provide a superior content playback technique capable of securely (that is, while protecting the copyright) using content, as music and video, of which a content creator has a predetermined use right, including the copyright.

According to the present invention, it is possible to provide a superior content playback technique capable of performing copyright protection by permitting use of an encrypted content by using a token.

According to the present invention, it is possible to provide a superior content playback technique capable of sharing content among plural users who have a token of the encrypted content.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A system for playing back encrypted content that is initially held in a first end-user device using a temporary playback end-user device, said system comprising:
   at least one portable cellular telephone that is authorized to obtain, from a content provider, the encrypted content and a token for decrypting the encrypted content; and
   a vehicle mounted playback unit associated with a unique digital signature, said vehicle mounted playback apparatus being the temporary playback end-user device;
   said at least one portable cellular telephone including:
      means for receiving, over a cellular telephone channel, an RF signal that includes the encrypted content and the token, means for establishing short distance wireless communication between said portable cellular telephone and said vehicle mounted playback apparatus, means for transmitting the encrypted content to said vehicle mounted playback unit using the short distance wireless communication, and means for transmitting, subsequent to said transmitting of the content, a content playback request and a content identifier associated with the transmitted content to the vehicle mounted playback apparatus using the short distance wireless communication;

said vehicle mounted playback unit further including:

means for storing the encrypted content, and means for transmitting, upon receiving the content playback request, a token delivery request that includes the unique digital signature associated with the vehicle mounted playback apparatus to the portable cellular telephone using the short distance wireless communication, the unique digital signature including a public key associated with the vehicle mounted playback apparatus;

said at least one portable cellular telephone further including:

means for authenticating the digital signature associated with the vehicle mounted playback apparatus, means for encrypting, using the public key associated with the vehicle mounted playback apparatus, the token when the digital signature of said vehicle mounted playback apparatus is successfully authenticated, and means for transmitting the encrypted token to the vehicle mounted playback unit using the short-distance wireless communication;

said vehicle mounted playback unit further including:

means for decrypting the encrypted token using a secret key associated with said vehicle mounted playback apparatus, means for temporarily storing the decrypted token;

means for decoding the encrypted content using the decrypted token, a playback section for playing back the decrypted content; and means for automatically discarding the stored token upon playing back the decoded content or upon termination of the short distance wireless communication between said portable cellular telephone and said vehicle mounted playback apparatus, thereby preventing transfer of the token from said vehicle mounted playback apparatus.

2. The system according to claim 1, wherein said at least one portable cellular telephone holds two or more pieces of encrypted content and a corresponding token, each of the pieces of encrypted content being received over the at least one cellular telephone channel by said means for receiving.

3. The system according to claim 1, wherein the public key associated with said vehicle mounted playback unit is contained in the unique digital signature.

4. The system according to claim 1, wherein at least one of said at least one portable cellular telephone and said vehicle mounted playback unit are mounted on a circuit package having a temper resistant characteristic.

5. The system according to claim 1, wherein said at least one portable cellular telephone is one of a plurality of portable cellular telephones that have established short distance wireless data communication with said vehicle mounted playback unit, and said vehicle mounted playback unit broadcasts a token delivery request to each of said plurality of portable cellular telephones that is intended for a given one of said plurality of cellular telephones.

6. A method for using a temporary playback end-user device to play back encrypted content that is initially held in another end-user device, said method comprising:

receiving, at a portable cellular telephone over a cellular telephone channel, an RF signal that includes the encrypted content and a token for decrypting the encrypted content, the portable cellular telephone being authorized to obtain the encrypted content and the token from a content provider;

establishing short distance wireless communication between the portable cellular telephone and a vehicle mounted playback apparatus, the vehicle mounted playback apparatus being the temporary playback end-user device;

transmitting the encrypted content from the portable cellular telephone to the vehicle mounted playback apparatus using the short distance wireless communication;

storing the encrypted content in the vehicle mounted playback apparatus;

transmitting, after said transmitting of the content, a content playback request and a content identifier associated with the transmitted content from the portable cellular telephone to the vehicle mounted playback apparatus using the short distance wireless communication;

transmitting, in response to receiving the content playback request, another delivery request that includes a unique digital signature associated with the vehicle mounted playback apparatus from the vehicle mounted playback apparatus to the portable cellular telephone using the short distance wireless communication, the unique digital signature including a public key associated with the vehicle mounted playback apparatus;

authenticating, at the portable cellular telephone, the digital signature associated with the vehicle mounted playback apparatus; and when the digital signature associated with the vehicle mounted playback apparatus is successfully authenticated:

encrypting, at the portable cellular telephone using the public key associated with the vehicle mounted playback apparatus, the token for decrypting the encrypted content upon authenticating the digital signature, transmitting the encrypted token from the portable cellular telephone to the vehicle mounted playback apparatus using the short-distance wireless communication, decrypting, at the vehicle mounted playback apparatus, the encrypted token using a secret key associated with the vehicle mounted playback apparatus, temporarily storing the decrypted token at the vehicle mounted playback apparatus, decoding, at the vehicle mounted playback apparatus, the encrypted content using the decrypted token, playing back the decoded content using the vehicle mounted playback apparatus, and automatically discarding the decrypted token stored at the vehicle mounted playback apparatus upon playing back the decoded content or upon termination of the short distance wireless communication between the portable cellular telephone and the vehicle mounted playback apparatus, thereby preventing transfer of the token from the vehicle mounted playback apparatus.

7. The method according to claim 6, wherein the portable cellular telephone holds two or more pieces of encrypted content and a corresponding token, each of the pieces of encrypted content being received over the cellular telephone channel in said step of receiving an RF signal, said method further comprising:
transferring, using the short distance wireless communication, all of the pieces of encrypted content in advance to the vehicle mounted playback apparatus from the portable cellular telephone; and
storing all of the pieces of encrypted content in the vehicle mounted playback apparatus.

8. The method according to claim 6, wherein the public key of the vehicle mounted playback apparatus is contained in the digital signature.

9. The method according to claim 6, wherein at least one of the portable cellular telephone and/or the vehicle mounted playback apparatus is mounted on a circuit package having a tamper resistant characteristic.

10. The method according to claim 6, wherein the portable cellular telephone is one of a plurality of portable cellular telephones that have established short distance wireless data communication with the vehicle mounted playback unit, and the vehicle mounted playback apparatus broadcasts a token delivery request using the short-distance wireless communication to each of the plurality of portable cellular telephones that is intended for a particular one of the plurality of portable cellular telephones.

11. A system for playing back encrypted content that is initially held in at least one first end-user apparatus using a temporary playback end-user device, said system comprising:
a first portable cellular telephone unit;
a second portable cellular telephone unit, said first portable cellular telephone unit and said second portable cellular telephone unit each being authorized to obtain the encrypted content and a token for decrypting the encrypted content from a content provider; and
a vehicle mounted playback unit associated with a unique digital signature, the vehicle mounted playback apparatus being the temporary playback end-user device;
said first portable cellular telephone unit, including:
means for receiving, over a cellular telephone channel, an RF signal that includes at least the encrypted content
means for storing the encrypted content,
means for establishing short distance wireless communication with said vehicle mounted playback apparatus,
means for transmitting the encrypted content to said vehicle mounted playback apparatus using the short distance wireless communication, and
means for transmitting, after said transmitting of the encrypted content, a content playback request and a content identifier associated with the transmitted content to said vehicle mounted playback apparatus using the short distance wireless communication;
said second portable cellular telephone unit including:
means for receiving, over a cellular telephone channel, another RF signal that includes at least the token,
means for holding the token, and
means for establishing short distance wireless communication with said vehicle mounted playback apparatus;
said vehicle mounted playback unit including:
means for storing the encrypted content, and
means for transmitting, upon receiving the content playback request from said first portable cellular telephone unit, a token delivery request that includes the unique digital signature associated with said vehicle mounted playback apparatus to said second portable cellular telephone unit using the short distance wireless communication, the unique digital signature including a public key associated with said vehicle mounted playback apparatus;
said second portable cellular telephone unit further including:
means for authenticating the digital signature associated with said vehicle mounted playback apparatus,
means for encrypting, when the digital signature associated with said vehicle mounted playback apparatus is successfully authenticated, the token for decrypting the encrypted content using the public key associated with said vehicle mounted playback apparatus, and
means for transmitting the encrypted token, using the short distance wireless communication, to said vehicle mounted playback apparatus;
said vehicle mounted playback apparatus further including:
means for decrypting the encrypted token using a secret key associated with said vehicle mounted playback apparatus,
means for temporarily storing the decrypted token,
means for decoding the encrypted content using the decrypted token,
a play back section for playing back the decrypted content, and
means for automatically discarding the stored token upon playing back the decoded content or upon termination of the short distance wireless communication between said vehicle mounted playback apparatus and said second portable cellular telephone unit, thereby preventing transfer of the token from said vehicle mounted playback apparatus.

12. The system according to claim 11, wherein the public key of the token delivery request is contained in the digital signature.

13. A vehicle mounted playback end-user apparatus for temporary play back of encrypted content that is initially held in another end-user device, said vehicle mounted end-user apparatus comprising:
means for holding a unique digital signature associated with said vehicle mounted playback apparatus;
means for holding a secret key associated with said vehicle mounted playback apparatus;
means for establishing short distance wireless communication with a portable cellular telephone holding the encrypted content and a token for decrypting the encrypted content, the portable cellular telephone being authorized to obtain the encrypted content and the token from a content provider;
means for receiving the encrypted content from the portable cellular telephone using the short distance wireless communication;
means for storing the encrypted content;
means for receiving, subsequent to said receiving of the encrypted content, a content playback request and a content identifier associated with the transmitted content from the portable cellular telephone using the short distance wireless communication;

means for transmitting, in response to said receiving of the content playback request, a token delivery request that includes the unique digital signature associated with said vehicle mounted playback apparatus to the portable cellular telephone using the short distance wireless communication, the unique digital signature including a public key associated with the vehicle mounted playback apparatus;

means for receiving, in response to said transmitting the unique digital signature and a public key, an encrypted token from the portable cellular telephone using the short-distance wireless communication, the encrypted token being the token held by the portable cellular telephone which is encrypted using the public key associated with said vehicle mounted playback apparatus, said receiving of the encrypted token indicating that the digital signature associated with said vehicle mounted playback apparatus was successfully authenticated by the portable cellular telephone;

means for decrypting the encrypted token using a secret key associated with the vehicle mounted playback apparatus;

means for temporarily storing the decrypted token;

means for decoding the encrypted content using the decrypted token;

means for playing back the decrypted content means for automatically discarding the stored token upon playing back the decoded content or upon termination of the short distance wireless communication with the portable cellular telephone, thereby preventing transfer of the token from said vehicle mounted playback apparatus.

14. The vehicle mounted playback apparatus according to claim 13, wherein the digital signature contains the public key associated with the vehicle mounted playback apparatus.

* * * * *